United States Patent
Tenca et al.

(10) Patent No.: US 9,568,896 B2
(45) Date of Patent: Feb. 14, 2017

(54) CONTROL DEVICE AND METHOD FOR CONTROLLING AN ELECTRIC MACHINE

(71) Applicant: ABB Schweiz AG, Baden (CH)

(72) Inventors: Pierluigi Tenca, Genoa (IT); Rahul Kanchan, Vasteras (SE)

(73) Assignee: ABB Schweiz AG, Baden (CH)

( * ) Notice: Subject to any disclaimer, the term of this patent is extended or adjusted under 35 U.S.C. 154(b) by 549 days.

(21) Appl. No.: 14/143,882

(22) Filed: Dec. 30, 2013

(65) Prior Publication Data

US 2014/0188254 A1    Jul. 3, 2014

Related U.S. Application Data (63) Continuation of application No. PCT/EP2012/060301, filed on May 31, 2012.

(30) Foreign Application Priority Data

Jun. 30, 2011   (EP) .................................... 11172047

(51) Int. Cl.
  *G05B 11/01*   (2006.01)
  *G06F 19/00*   (2011.01)
  (Continued)

(52) U.S. Cl.
  CPC ............... *G05B 13/04* (2013.01); *G05B 17/02* (2013.01); *H02P 23/12* (2013.01)

(58) Field of Classification Search
  None
  See application file for complete search history.

(56) References Cited

U.S. PATENT DOCUMENTS 9,007,004 B2 *   4/2015   Hunter ................ H02P 21/0003
                                                    318/400.02
2003/0163296 A1 *   8/2003   Richards ............. G06F 17/5036
                                                    703/14
(Continued)

FOREIGN PATENT DOCUMENTS

DE        4115338 A1    11/1992
WO      03073185 A2     9/2003
(Continued)

OTHER PUBLICATIONS

European Search Report Application No. EP 11 17 2047 Completed: Dec. 15, 2011; Mailing date: Jan. 2, 2012 6 pages.
(Continued)

*Primary Examiner* — Adam Lee
(74) *Attorney, Agent, or Firm* — Whitmyer IP Group LLC (57) ABSTRACT

A control device for controlling an electric machine with ks windings on a stator and kr windings on a rotor, where ks+kr=n and either ks or kr may be zero, includes an input for receiving commands, an output for outputting control commands to a driver, machine modeling means for modeling behavior of the machine, and decision means connected to the input, output, and machine modeling means for determining the driver control commands. The machine modeling means models behavior of the machine through functional mapping suited for correlating sets of values of electrical and mechanical quantities, sets of values of their total or partial derivatives and/or integral functions with one another. The functional mapping includes an algorithm and/or equation based on at least one state function associated with the electromagnetic field inside the machine and/or based on at least one partial derivative of the state function.

20 Claims, 4 Drawing Sheets

(51) Int. Cl.
*G05D 3/12* (2006.01)
*G05B 13/04* (2006.01)
*G05B 17/02* (2006.01)
*H02P 23/12* (2006.01)

(56) References Cited

U.S. PATENT DOCUMENTS

| | | |
|---|---|---|
| 2004/0079173 A1 | 4/2004 | Neely et al. |
| 2009/0108782 A1* | 4/2009 | Klatt .................. B60Q 1/30 318/400.17 |
| 2009/0200979 A1 | 8/2009 | Sasaki et al. |
| 2009/0267550 A1 | 10/2009 | Hida et al. |
| 2010/0262307 A1 | 10/2010 | Imura |

FOREIGN PATENT DOCUMENTS

| | | |
|---|---|---|
| WO | 03100959 A2 | 12/2003 |
| WO | 2007092466 A2 | 8/2007 |

OTHER PUBLICATIONS

International Search Report and Written Opinion of the International Searching Authority Application No. PCT/EP2012/060301 Completed: Oct. 9, 2013; Mailing Date: Oct. 17, 2013 11 pages.

\* cited by examiner

CONTROL DEVICE AND METHOD FOR CONTROLLING AN ELECTRIC MACHINE

FIELD OF THE INVENTION

The present invention generally relates to the control of generic electric machines. Particularly, the invention relates to an improved control device and method for controlling an electric machine.

BACKGROUND OF THE INVENTION

Pseudo-linear machine models based on time-varying inductance matrix are theoretically correct only when the media, in which the electromagnetic field exists, can be assumed linear. Exclusively in such a case indeed, the n fluxes linked with each of the n windings are correctly expressible as linear combinations of the n currents in their whole domain. Any attempt to improve such models, aimed at incorporating the non-linear behavior, is theoretically not correct, even if it leads to acceptable quantitative results in some operating conditions. Such improved models can generate heavily mistaken results if one pretends to extend them beyond their usual scope of validity.

In substance, the correct modeling of electric machines, accounting also for magnetic non linearities and/or presence of permanent magnets, demands from the very beginning that the theoretical and procedural approach be radically different from the ones still widely used today, which represented the almost unique practicable way in absence of powerful computers.

DE4115338A1 discloses a control device capable of detecting and/or regulating position or angular velocity of a rotor of an electrical machine by using a Kalman filter.

SUMMARY OF THE INVENTION

It is an object of the present invention to provide a control device and a control method, respectively, for the control of an n-windings electric machine which overcome the limitations disclosed above.

It is a particular object of the invention to provide such device and such method, which are more accurate and precise than prior art devices and methods, and by which improved control of the electric machine can be obtained.

These objects, among others, are according to the present invention, attained by devices and methods as claimed in the appended claims.

According to a first aspect of the invention there is provided a real-time control device for controlling an electric machine with ks windings on a stator and kr windings on a rotor, wherein ks+kr=n and wherein either one of ks and kr may be zero. The control device comprises an input via which control commands are capable of being received in real-time and an output via which control commands to a driver of the electric machine are capable of being output in real-time; machine modeling means provided for modeling the behavior of the electric machine in real time; and decision means operatively connected to the input, the output, and the machine modeling means and provided for (i) determining in real-time the control commands to be output to the driver of the electric machine based on input control commands and results from the modeling of the behavior of the electric machine, and (ii) outputting in real-time the determined control commands at the output. The machine modeling means is provided for modeling in real-time the behavior of the electric machine through at least one functional mapping suited for correlating sets of values of electrical and mechanical quantities and/or sets of values of their total or partial derivatives and/or integral functions with one another, wherein the electrical and mechanical quantities comprise winding currents, winding voltages, magnetic fluxes, mechanical displacements, and/or electromagnetic torques or forces, and the functional mapping is comprised of at least one algorithm and/or mathematical equation based on at least one state function associated with the electromagnetic field inside the electrical machine and/or based on at least one partial derivative of the state function. Hereby an accurate and precise control of the electric machine is enabled, especially in presence of non-linear media. It shall be observed that the machine modeling means does not necessarily require any mathematical transformation on the physical quantities defining the domain of the state function. The modeling may thus be performed without such transformation.

In one embodiment, the machine modeling means is provided with a numerical model of the coenergy or energy associated with the electromagnetic field distribution inside the electric machine, and/or at least one partial derivative thereof. The numerical model is in tabular form, e.g. typically the selected output from FEM (Finite Element Method) simulations of the electric machine. Alternatively, it is obtained from numerical computation of an analytical function.

In another embodiment the machine modeling means is provided as an artificial intelligence model (e.g. based on neural networks and/or fuzzy systems) that describes the state function (e.g. coenergy or energy) associated with the electromagnetic field.

In a further embodiment, the control device comprises an input via which the aforementioned measured or estimated electrical and/or mechanical quantities of the electric machine are capable of being received and wherein the machine modeling means is provided to identify the coenergy or energy associated with the electromagnetic field distribution inside the electric machine, and/or a partial derivative thereof, based on the measured or estimated quantities of the electric machine. Typically, the measured or estimated quantities of the electric machine comprise at least one current in at least one of the n windings and at least one voltage across at least one of the n windings preferably as measured or estimated while the rotor of the electric machine is stationary in at least one selected angular position.

Other measurable quantities which can be used in the identification of the coenergy or energy associated with the electromagnetic field distribution inside the electric machine, and/or the partial derivative thereof, may comprise at least one electrical resistance of at least one of the n windings, the mechanical torque at the shaft of the electric machine, and/or the total first order derivatives of at least one of the winding currents.

According to a second aspect of the invention there is provided a control method for controlling an electric machine with ks windings on a stator and kr windings on a rotor, wherein ks+kr=n and wherein either one of ks and kr may be zero. According to the method input control commands are received in real-time; the behavior of the electric machine is modeled in real-time; control commands to be output to a driver of the electric machine are determined in real-time based on the input control commands and results from the modeling of the behavior of the electric machine; and the determined control commands are output to the electric machine in real-time. The modeling of the behavior of the electrical machine is made through at least one functional mapping suited for correlating sets of values of electrical and mechanical quantities and/or sets of values of their total or partial derivatives and/or integral functions with one another, wherein the electrical and mechanical quantities comprise winding currents, winding voltages, magnetic fluxes, mechanical displacements, and/or electromagnetic torques or forces, and the functional mapping is comprised of at least one algorithm and/or mathematical equation based on at least one state function associated with the electromagnetic field inside the electrical machine and/or based on at least one partial derivative of the state function.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1-5, which are given by way of illustration only, and thus are not limitative of the present invention.

DETAILED DESCRIPTION OF THE INVENTION

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known techniques are omitted so as not to obscure the description of the present invention with unnecessary details.

Figure 1:
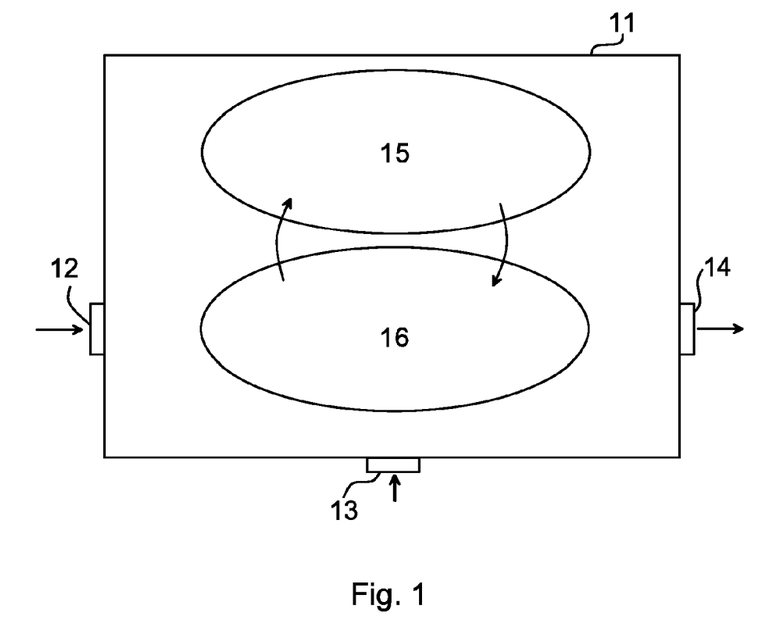
FIG. 1 displays schematically a control device for controlling an n-windings electric machine according to an embodiment of the invention.

A real-time controller or control device 11 for controlling an n-windings electric machine according to an embodiment of the invention is displayed schematically in FIG. 1. The electric machine has ks windings on the stator and kr windings on the rotor wherein ks+kr=n and wherein either one of ks and kr may be zero. The control device 11 comprises an input 12 via which control commands are capable of being received, optionally an input 13 via which measured or estimated quantities of the electric machine are capable of being received, and an output 14 via which control commands to a driver of the electric machine are capable of being output. The control device further comprises machine modeling means 15 and decision means 16, preferably provided as a microcomputer device provided with suitable software.

Figure 2:
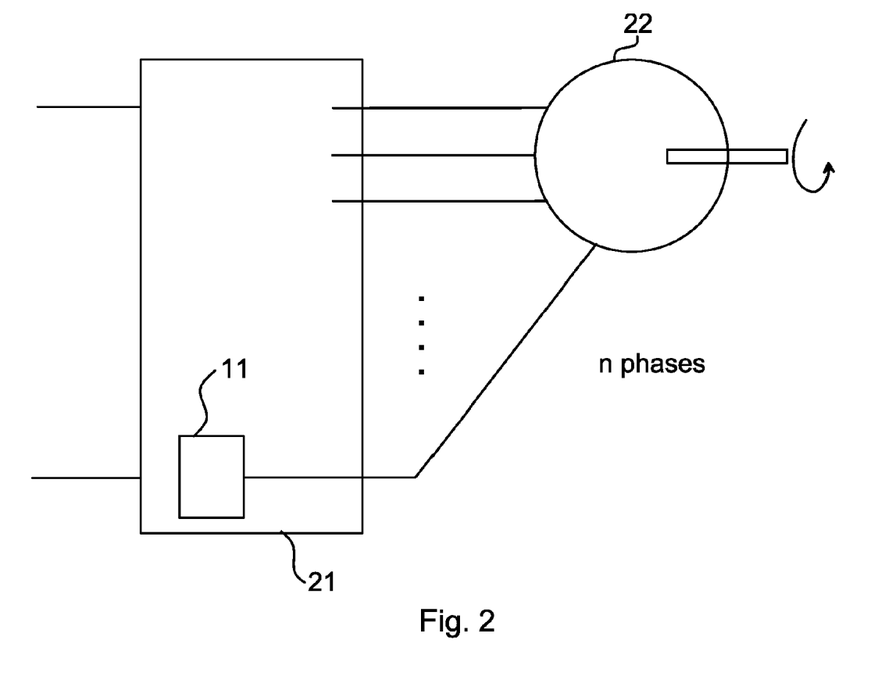
FIG. 2 displays schematically a driver and an n-windings electric machine according to an embodiment of the invention.

FIG. 2 displays schematically a driver 21, e.g. a variable speed drive (VSD) system, in which the control device 11 may be arranged. The driver 21 is operatively connected to an n-windings electric machine 22 for driving the same.

The machine modeling means 15 of the control device 11 is provided for modeling the behavior of the electric machine 22 by using a model based on a state function associated with the electromagnetic field distribution inside the electric machine 22, and/or based on at least one of its partial derivatives. The state function may be the energy, but is more comfortably the coenergy associated with the electromagnetic field distribution inside the electric machine 22, or partial derivatives thereof. The decision means 16 is operatively connected to the inputs 12, 13, to the output 14, and to the machine modeling means 15 and is provided for determining the control commands, and/or on measured or estimated quantities 13, to be output to the electric machine 22 at the output 14 based on input control commands and results from the modeling of the behavior of the electric machine as performed by the machine modeling means 15. Subsequently, the decision means outputs determined control commands at the output 14. The modeling means may be connected directly to the inputs 12, 13 and the output 14.

The coenergy-based model of the electric machine 22, characterized by one moving part (the "rotor") rotating around an axis can be described by the following equation system:

$$\begin{cases} \dfrac{d}{dt}\underbrace{\left(\dfrac{\partial Wco(\vec{i}(t), \theta_m(t))}{\partial i_j}\right)}_{\text{Flux } \lambda_j(\vec{i}(t), \theta_m(t))} = v_j(t) - r_j \cdot i_j(t) \\ \underbrace{\dfrac{\partial Wco(\vec{i}(t), \theta_m(t))}{\partial \theta_m}}_{\text{Torque } Tem(\vec{i}(t), \theta_m(t))} + T_l(t) = J \cdot \dfrac{d\omega_m(t)}{dt} \end{cases}$$

wherein the first equation of the system is provided in a plurality, expressed by the natural index j, corresponding to the number n of windings. The index j ranges from 1 to n, and the symbols present in the equations are identified as follows:

| SYMBOL | MEANING |
|---|---|
| $\theta_m$ | Scalar value of the angular position of the rotor |
| $\omega_m$ | Scalar value of the rotational speed of the rotor around its axis assumed stationary in an inertial reference frame |

-continued

| SYMBOL | MEANING |
|---|---|
| $\bar{i}$ | Vector of the n winding currents. |
| $v_j, i_j$ | Voltage and current of the $j^{th}$ winding (a two-terminal network) $j \in \{1 \ldots n\}$. They are referred to the users' convention with the current reference direction entering the winding terminal. |
| J | Equivalent total moment of inertia of the rotating masses. It is referred to the rotor axis of rotation. (C) |
| $r_j$ | Resistance of the $j^{th}$ winding (C). $j \in \{1 \ldots n\}$. |
| $Wco(\bar{i}, \theta_m)$ | Coenergy of the electromagnetic field in the overall machine space, expressed as state function of the winding currents and angular position of the rotor |
| $v_j, i_j$ | Voltage and current of the $j^{th}$ winding (a two-terminal network) $j \in \{1 \ldots n\}$. They are referred to the users' convention with the current reference direction entering the winding terminal. |
| $T_l$ | Scalar value of the torque exerted by the mechanical system coupled to the electrical machine. It is referred to the rotor axis of rotation |

By trivial manipulation the equation system above can be rewritten in the form shown below:

$$\begin{cases} \sum_{k=1}^{n} \left\{ \left[ \frac{\partial^2 Wco(\bar{i}(t), \theta_m(t))}{\partial i_j \partial i_k} \right] \cdot \frac{d i_k(t)}{dt} \right\} + \\ \frac{\partial^2 Wco(\bar{i}(t), \theta_m(t))}{\partial i_j \partial \theta_m} \cdot \omega_m(t) = v_j(t) - r_j \cdot i_j(t) \\ J \cdot \frac{d\omega_m(t)}{dt} = \frac{\partial Wco(\bar{i}(t), \theta_m(t))}{\partial \theta_m} + T_l(t) \\ \frac{d\theta_m(t)}{dt} = \omega_m(t) \end{cases}$$

wherein the first equation of the system is provided in a plurality, expressed by the natural index j, corresponding to the number n of windings and the symbols of the equations are identified as above.

By observing the above equations it can be noted that once suitable partial derivatives of the coenergy are known, the model for control purposes is completely defined and computable. The iron losses are not comprised, but can be modeled separately.

The machine modeling means can be provided with the coenergy partial derivatives either numerically in tabular form or in a discretized form of an analytical function or an artificial intelligence descriptor, preferably consisting of a set of artificial neural networks and/or fuzzy inferences.

The partial derivatives can also by definition be calculated from the coenergy state function, if this is known with sufficient accuracy for numerical differentiation. If the coenergy is known analytically, the partial derivatives are derived by analytical differentiation. If the coenergy is known in tabular form, a sufficient number of points are needed to limit the numerical error affecting the numerical differentiation techniques that can be employed. It should be highlighted that the computation of the coenergy or the energy is a standard feature in almost all FEM simulators today. For a specific machine design it is therefore procedurally straightforward to obtain the coenergy function in a tabular form for a chosen set of currents and angle values.

The models of any electromechanical converter which are based on state functions (energy or coenergy) associated with the electromagnetic field distribution have always been recognized as the only correct ones, especially in presence of non-linear media. Their adoption has always been impractical in the past because of the lack of computational power, both for what concerns the machine design and machine control aspects, as well as for what it concerns the instrumentation, which was incapable of intense and complex data acquisition and post-processing. Conversely nowadays, the availability of inexpensive fast computers, even inside the real-time controllers and the instrumentation, enables the machine analysis and control to the aforementioned correct fundamental models based on state functions, most comfortably the coenergy.

The modeling approach has the advantage of stemming from the unified vision of the electromechanical conversion, since; ultimately, only one electric machine exists. The approach is valid for all different types of electric machines. It is therefore suitable for a standardization of treatments, both in design/simulation and control, with consequent cost reductions brought by the possible uniformation of analysis and control platforms.

If the coenergy function is not known analytically or through simulations, the machine modeling means 15 can be provided to identify the coenergy associated with the electromagnetic field distribution inside the electric machine 22 based on the measured or estimated quantities of the electric machine 22 as received via the input 13 of the control device 11.

It shall also be appreciated that even if the coenergy function is known analytically or through simulations this estimated coenergy function may differ from how the electric machine actually behaves. In such instance, measured or estimated quantities of the electric machine 22 as received via the input 13 of the control device 11 may be used to enhance the already existing coenergy model of the electric machine.

Any method of such machine identification, especially if based on state functions, strongly benefits from a good knowledge of the fluxes linked with the machine windings. Such fluxes in principle can either be directly measured with sensors sensible to the magnetic field or indirectly obtained by integration of the voltages induced in them. This latter approach is still the technologically simpler nowadays, but it is also prone to errors that the following proposed aspect of the invention is meant to reduce.

If all windings are accessible the coenergy can be determined based on currents in the n windings and voltages across the n windings as measured while the rotor of the electric machine is stationary in a selected angular position. See Equation 3.2 below:

$$\begin{cases} Wco(\vec{i}^*(t), \theta_m^*) = \underbrace{\int_{0-}^{t} [v_p(\vec{i}^*(\zeta), \vartheta) - r_p \cdot i_p^*(\zeta)] d\zeta \cdot i_p^*(t) \bigg|_{\vartheta=\theta_m^*, \frac{d\theta}{dt}=0}}_{\text{termA Scalar product between the variation of fluxes and currents}} + \\ \underbrace{-\int_{0-}^{t} \{[v_\chi(\vec{i}^*(\varepsilon), \vartheta) - r_\chi \cdot i_\chi^*(\varepsilon)] \cdot i_\chi^*(\varepsilon)\} d\varepsilon \bigg|_{\vartheta=\theta_m^*, \frac{d\theta}{dt}=0}}_{\text{termB Variation of Energy stored in the electromagnetic field}} + \\ + \underbrace{\lambda_p(\overline{0_n}, \theta_m^*)}_{p^{th}\text{Constant initial flux}} \cdot i_p^*(t) + \underbrace{Wco(\overline{0_n}, \theta_m^*)}_{\text{Constant initial coenergy equal to }-Wc(\overline{0_n}, \theta_m^*)} \\ i_1^*(t) \\ i_2^*(t) \\ \vdots \\ i_n^*(t) \end{cases} \Rightarrow Wco(\vec{i}^*, \theta_m^*) \quad (3.2)$$

A main obstacle in good flux determination through time integration of voltages is the necessary knowledge of the winding resistances and their variations which must be continuously tracked for maintaining an acceptable accuracy. In order to overcome this limitation, especially for more valuable high-power machines and processes, it is proposed the addition of small "sensing" windings in the electric machine; windings disposed in such a way that each of them follows as much as possible the geometrical path of the normal "power" winding to which it is associated. If such a condition is satisfied the sensing winding is subject to a field distribution almost identical to the one of the corresponding power winding. As a consequence the voltage induced in the sensing winding, and the flux linked with it, are proportional, with very good approximation, to the voltage induced in the power winding and its linked flux, respectively. The factor of proportionality is clearly the ratio among the number of turns in the sensing and power windings. If the field is sufficiently intense the sensing winding could be realized very simply by one single turn of wire disposed along the path of the associated power winding.

Figure 3:
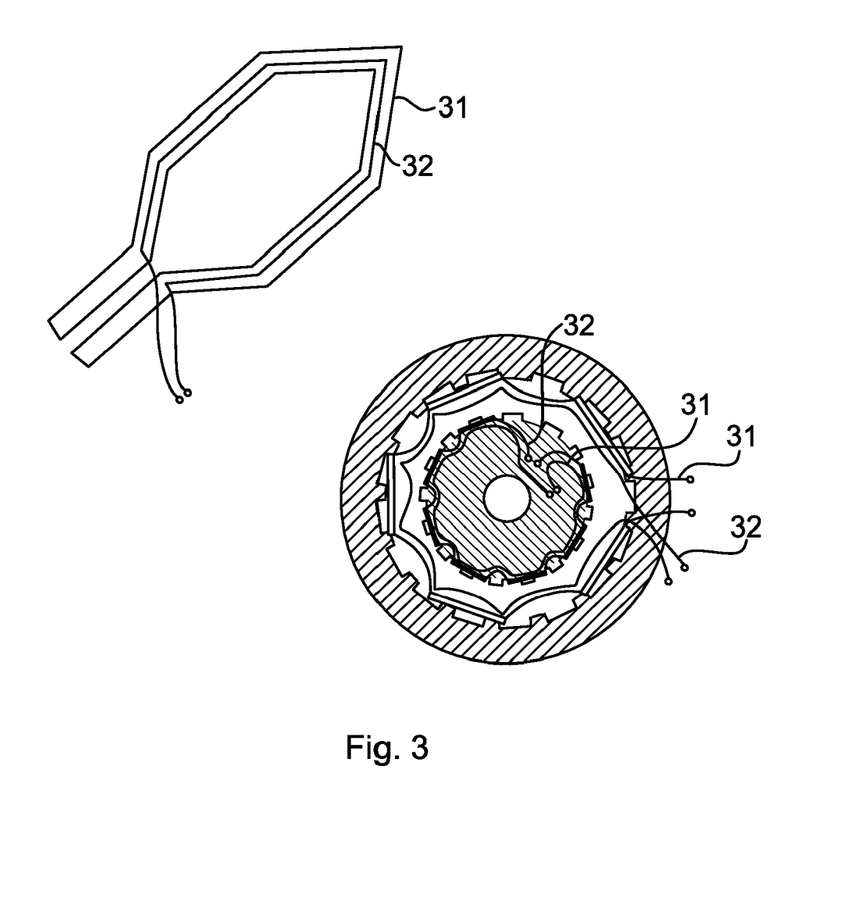
FIG. 3 displays schematically, a sensing winding embedded in a coil winding (upper left portion) and in radial cross section an electric machine with a rotor and a stator, both having coil windings and sensing windings embedded therein.

Although different arrangements of this principle are possible, a possible one is to embed a sensing coil—made of very thin wire with proper voltage insulation level—inside each coil composing the power winding as being illustrated in FIG. 3. The sensing wire 32 can be embedded during the wrapping of the coil insulation layers so that each coil 31 receives two additional terminals which belong to the sensing winding 32. As being illustrated in the upper left portion of FIG. 3. Afterwards, when the coils are connected properly to compose a winding, their respective sensing wires are connected in the same order thereby realizing straightforwardly the sensing winding, which develops itself all along the "curve" of the power winding, as can be seen in the lower right portion of FIG. 3, in which the coil windings 31 and the sensing windings 32 are visible both on the rotor and on the stator of the electric machine.

All terminals of the sensing windings are then concentrated into a separate terminal box of the electric machine, where the voltages can be measured and sent to the drive controller, or even amplified and integrated locally if necessary or requested by the customer. Clearly these voltages truly reflect the total time derivative of the magnetic fluxes linked with the power windings only, without any undesired component due to the resistive drop that is therefore rendered completely uninfluenced. There is no longer any need of tracking or even knowing the resistances of the power windings.

An electric machine with these sensing windings can be offered to the customer as an enhanced version for more performing control and/or diagnostic. The additional manufacturing cost is limited but the additional value for the customer and drive manufacturer can be significant. As mentioned previously, the integration of the voltages could be performed even locally, in the terminal box of the sensing windings, similarly to what is done by the integrating amplifiers present in the current sensors based on Rogowski coils. Electric machines can therefore be manufactured that already provide either the signals proportional to the important fluxes above a certain speed (i.e. the already integrated sensed voltages), or the sensed voltages only, leaving in this case the integration to a separate purchasable set of amplifiers designed for this purpose.

It can be observed that it is not necessary to equip all power windings with an associated sensing winding. One can limit itself to the minimum number of sensing windings which are necessary for the machine identification or sensorless control, as described in detail below.

In order to adhere to a common commissioning requirement, it has been chosen to identify the coenergy-based model of the electric machine, for what is possible, keeping the rotor locked at standstill. This locking is realized by suitable mechanical means.

If all windings of the machine have observable currents, the coenergy can be determined with measurements at the electrical terminals only through Equation 3.2:

$$\begin{cases} Wco(\vec{i}^*(t), \theta_m^*) = \underbrace{\int_{0-}^t [v_p(\vec{i}^*(\overline{\zeta}), \theta) - r_p \cdot i_p^*(\overline{\zeta})] d\overline{\zeta} \cdot i_p^*(t) \Big|_{\theta=\theta_m^*, \frac{d\theta}{dt}=0}}_{\text{termA Scalar product between the variation of fluxes and currents}} + \\ \qquad - \underbrace{\int_{0-}^t \{[v_\chi(\vec{i}^*(\varepsilon), \vartheta) - r_\chi \cdot i_\chi^*(\varepsilon)] \cdot i_\chi^*(\varepsilon)\} d\varepsilon \Big|_{\vartheta=\theta_m^*, \frac{d\theta}{dt}=0}}_{\text{termB Variation of Energy stored in the electromagnetic field}} + \\ \qquad + \underbrace{\lambda_p(\overline{0_n}, \theta_m^*)}_{p^{th}\text{Constant initial flux}} \cdot i_p^*(t) + \underbrace{Wco(\overline{0_n}, \theta_m^*)}_{\text{Constant initial coenergy equal to}-Wc(\overline{0_n}, \theta_m^*)} \\ i_1^*(t) \\ i_2^*(t) \\ \vdots \\ i_n^*(t) \end{cases} \Rightarrow Wco(\vec{i}^*, \theta_m^*) \quad (3.2)$$

The details are described in section 3.1 and the steps in 3.1.1. More accurate measurement of the coenergy or identification of the input-output mapping caused by it—sufficient for electric machines with non observable windings—demand the measurement of the electromagnetic torque at standstill and at different shaft angles imposed during the procedure.

Since the torque is measured at standstill the use of an expensive torsiometer—aimed at measuring the torque during rotation—is not necessary. A more accurate measurement technique can use load cells (usually more accurate than a torsiometer) and a sufficiently stiff mechanical arrangement that connects them to the machine base while allowing the imposition of the desired angle.

Figure 4A:
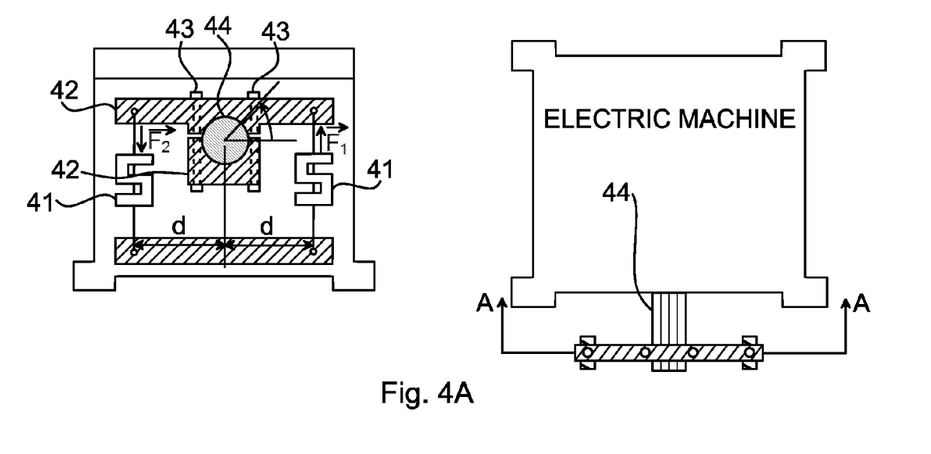
FIGS. 4A-B display schematically, two arrangements for measuring the torque of the electric machine at standstill, the arrangements being capable of fine controlling the shaft angle. The right hand portion of the respective Figure displays in a top view the arrangement mounted in the electric machine whereas the left hand portion of the respective Figure is a cross section taken along line A-A of the top view.

One arrangement, illustrated in FIG. 4a, comprises two load cells 41 connected to a yoke 42 arranged around the shaft 44 in a friction-based coupling which is tightened by means of bolts 43 once the desired angle is imposed. This solution is suitable for shafts 44 already coupled to the load machinery, without possibility of being disconnected. In the other end the load cells 41 are connected to a fixed support connected to the base of the electric machine.

An alternative arrangement uses a yoke or leverage tightened to the machine shaft as above, but held steady by one (or two) hydraulic ("oleodynamic") pistons instead of load cells. The force can be transmitted by the hydraulic oil in the pressure pipes to a remote and more comfortable location where another receiving piston acts on one load cell. This is a much more flexible solution for the logistic and mounting, but care must be put in assuring that the deformation of the pipes and the compressibility of the hydraulic oil does not introduce excessive systematic errors in the measurement.

Figure 4B:
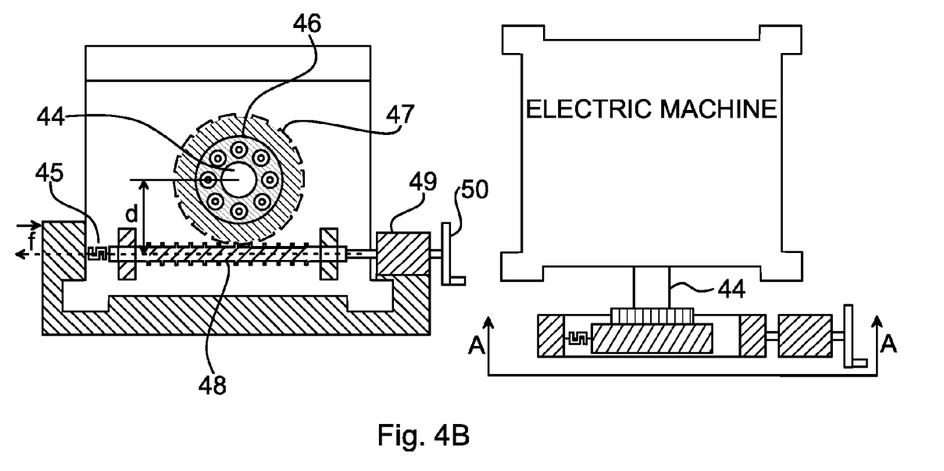

A yet alternative arrangement, illustrated in FIG. 4b, is coupled to the flange of one free side of the machine shaft 44, when available. Such a solution is the most comfortable from the operational point of view. It uses a worm-thread coupling whose pinion 46 is connected to the shaft 44. The pinion 46 has a helicoidal profile 47 which is brought into engagement with a thread 48, thereby converting the torque into an axial load which can be sensed by a load cell 45 connected axially between an end of the thread 48 and a fixed support of the electric machine. The pinion 46 could possibly be machined onto the machine shaft 44 itself, if the nominal torque to be withstood is not excessive. Because of the non reciprocity of the worm-thread coupling (provided that the thread angle is below a certain value), the arrangement is self-blocking for movements originating inside the machine. Conversely, the shaft can be easily and very precisely rotated by acting on the thread, either automatically via a servomotor 49 that allows also an automation of the identification procedure, or manually via a handle 50.

All apparatuses are removed at the end of the identification procedure.

The coenergy, like the energy, is a state function of the electromechanical system; therefore its value depends only on the point defined by its arguments, and not on the trajectory followed to reach that point. One can exploit this property to determine the coenergy more accurately through the following procedural choices, described more extensively below:

The electrical sources (VSDs or others) are connected to the machine winding and controlled so that they behave as current sources with DC waveforms in steady state.

The desired set of winding current values (one "point") is reached by varying linearly one current at the time, never two simultaneously. The other currents are kept at their preceding constant value while the selected one is varied. During these controlled transients the voltages and currents in all windings are recorded. With such recordings the coenergy value is updated through the Equation 3.2 below:

$$\begin{cases} \underbrace{\int_{0^-}^t [v_p(\vec{i}^*(\xi), \vartheta) - r_p \cdot i_p^*(\xi)] d\xi \cdot i_p^*(t) \Big|_{\vartheta=\theta_m^*, \frac{d\vartheta}{dt}=0}}_{\text{term A Scalar product between the variation of fluxes and currents}} + - \\ Wco(\vec{i}^*(t), \theta_m^*) = \underbrace{\int_{0^-}^t \{[v_\chi(\vec{i}^*(\varepsilon), \vartheta) - r_\chi \cdot i_\chi^*(\varepsilon)] \cdot i_\chi^*(\varepsilon)\} d\varepsilon \Big|_{\vartheta=\theta_m^*, \frac{d\vartheta}{dt}=0}}_{\text{term B Variation of Energy stored in the electromagnetic field}} ++ \\ \underbrace{\lambda_p(\overline{0_n}, \theta_m^*) \cdot i_p^*(t)}_{p^{th} \text{ Constant initial flux}} + \underbrace{Wco(\overline{0_n}, \theta_m^*)}_{\text{Constant initial coenergy equal to } -We(\overline{0_n}, \theta_m^*)} \\ i_1^*(t) \\ i_2^*(t) \\ \vdots \\ i_n^*(t) \end{cases} \Rightarrow Wco(\vec{i}^*, \theta_m^*) \quad (3.2)$$

The measured values of the winding resistances are updated only when all currents are constants because in such time intervals all winding voltages are composed by the resistive components only. Before performing the ratio between the measured voltages and currents, the measurements are averaged for a sufficiently long time in order to eliminate the systematic errors caused by the noise and unavoidable ripple presence, both characterized by zero average value.

Figure 5:
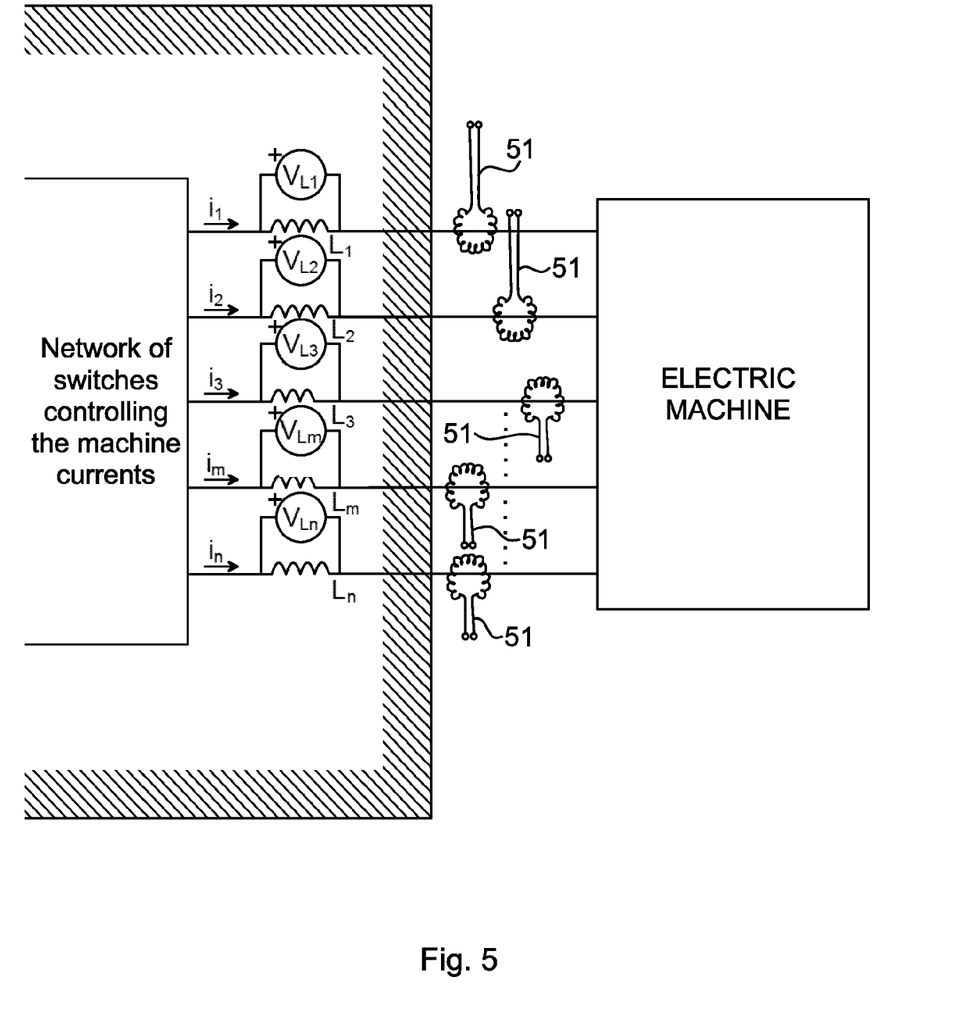
FIG. 5 displays schematically an arrangement for measuring total current derivatives of the currents in the power connections from a driver to the electric machine. The arrangement features sensing coils in series with, or arranged around, the power connections to the electric machine.

During the linear variation of one winding current only—while the others are kept constant—an even more direct determination of important partial derivatives of the coenergy can be performed. Such derivatives would constitute the elements of the matrix of inductances in case the machine was perfectly magnetically linear. This possibility encourages the direct measurement, in an analogical way, of the current derivatives. It is possible to do this with limited cost increase by inserting small calibrated inductances in series to each line connecting the drive to the machine as being illustrated in FIG. 5. The measurement of the voltage across such inductances is clearly proportional to the current derivative. An alternative, also shown in FIG. 5, employs sensing coils 51 (without integrating amplifier), e.g. Rogowski coils, mounted around the conductors. Rogowski coils without amplifiers are easily available as standard components ready to be purchased.

This latter solution has also the great advantage of being applicable to already existing converters—potentially under refurbishing or revamping—without the need of modifying their construction, as it would be the case when series inductances were used. Such converter might receive a new control device which incorporates the sensing of the Rogowski voltages, thereby increasing their capabilities and customer value at little additional cost in the revamping process.

Also the sensorless determination of the speed is improved by measuring the current derivatives directly. This is an additional reason for providing the VSD system with this capability.

It shall be noted that the present invention is not limited to a control device, but encompasses as well a driver, such as the driver 21 of FIG. 2, for an n-windings electric machine comprising the inventive control device.

Yet further, the invention also encompasses an n-windings electric machine 22, such as the electric machine 22 of FIG. 2, provided with a driver comprising the inventive control device.

Still further, the invention encompasses a control method for operating an inventive control device. Such method may comprise any of the method steps, procedure steps, or process steps as disclosed herein.

It will be obvious that the invention may be varied in a plurality of ways. Such variations are not to be regarded as a departure from the scope of the invention. All such modifications as would be obvious to one skilled in the art are intended to be included within the scope of the appended claims. Particularly, it shall be appreciated that the various features and limitations depicted herein can be used separately or can be combined in each possible manner to obtain different embodiments of the invention.

DEFINITIONS 1.3.1 List of Most Important Acronyms

The following acronyms are used throughout the document

| ACRONYM | TERMINOLOGY |
| --- | --- |
| FEM | Finite Element Method |
| PM | Permanent Magent(s) |
| LHS | Left Hand Side of an equation |
| RHS | Right Hand Side of an equation |
| PWM | Pulse Width Modulation |

Unless stated otherwise, the listed quantities are assumed to be real-valued functions of time. The time dependence can be explicit, or implicit if the functions are composed. The constant quantities are denoted by "(C)". Where the symbol of summation is not explicitly used, the tensorial notation indication summation over repeated indexes [1] is used throughout the whole document for sale of compactness and clarity of the expressions.

| SYMBOL | ASSOCIATED SIGNIFICANCE | MEAS. UNIT |
| --- | --- | --- |
| n | Total number of windings in the electrical machine (C). $n \in \mathbb{N} - \{0\}$ | adimensional |
| $n_s$ | Number of windings located on the stator of the electrical machine (C). $n_s \in \mathbb{N}$, $n_s \leq n$ | adimensional |

-continued

| SYMBOL | ASSOCIATED SIGNIFICANCE | MEAS. UNIT |
|---|---|---|
| $n_r$ | Number of windings located on the rotor of the electrical machine (C). $n_r = n - n_s$. | adimensional |
| $n_{NO}$ | Number of windings whose currents are not observed. $n_{NO}$ and $n_r$ are totally uncorrelated in general. | adimensional |
| $\delta_{jk}$ | Kronecker's delta. $\delta_{jk} = 1$ for $j = k$, 0 otherwise | adimensional |
| $\theta_m$ | Scalar value of the angular position of the rotor | [rad] |
| $\omega_m$ | Scalar value of the rotational speed of the rotor around its axis assumed stationary in an inertial reference frame | [rad/s] |
| $\overline{i}$ | Vector of the n winding currents. | [A] |
| $\overline{i_{NO}}$ | Vector of the $n_{NO}$ non observable winding currents. | [A] |
| $\overline{i_O}$ | Vector of the $n - n_{NO}$ observable winding currents. | [A] |
| $\overline{\lambda}$ | Vector of the n fluxes linked with the n windings. | [Wb] |
| $\overline{\lambda_{NO}}$ | Vector of the $n_{NO}$ fluxes linked with the windings whose currents are not observable. | [Wb] |
| $\overline{\lambda_O}$ | Vector of the $n - n_{NO}$ fluxes linked with windings whose currents are observable. | [Wb] |
| $\text{Tem}(\overline{i},\theta_m)$ | Scalar product of the electromagnetic torque (a vector in general) of the motor with the versor of the reference direction chosen along the rotor axis of rotation. It is a function of the winding currents and angular position of the rotor. The reference directions for the here coaxial vectors $\overline{\text{Tem}}$ and $\overline{\omega_m}$, are such that the mechanical power $\overline{\text{Tem}} \cdot \overline{\omega_m}$ is positive when exiting the electrical machine. | [N · m] |
| $T_l$ | Scalar value of the torque exerted by the mechanical system coupled to the electrical machine. It is referred to the rotor axis of rotation | [N · m] |
| J | Equivalent total moment of inertia of the rotating masses. It is referred to the rotor axis of rotation. (C) | [kg · m²] |
| $r_j$ | Resistance of the $j^{th}$ winding (C). $j \in \{1 \ldots n\}$. | [Ω] |
| $\text{We}(\overline{\lambda},\theta_m)$ | Energy of the electromagnetic field in the overall machine space, expressed as state function of the winding fluxes and angular position of the rotor | [J] |
| $\text{Wco}(\overline{i},\theta_m)$ | Coenergy of the electromagnetic field in the overall machine space, expressed as state function of the winding currents and anaular position of the rotor | [J] |
| $L_{jk}(\theta_m)$ | Mutual inductance between the j-th and k-th windings under the assumption of linear media. $j, k \in \{1 \ldots n\}$. For $j = k$ the quantity represents the self-inductance. Clearly $L_{jk}(\theta_m) = L_{kj}(\theta_m) \; \forall j, k \in \{1 \ldots n\}$ | [H] |
| $v_j, i_j$ | Voltage and current of the $j^{th}$ winding (a two-terminal network) $j \in \{1 \ldots n\}$. They are referred to the users' convention with the current reference direction entering the winding terminal. | [V], [A] |

General Model for Electrical Machines and its Computation

The parts composing the electric machines are assumed to be rigid bodies. It is further assumed that one of them can move in an inertial reference frame, with one single degree of freedom, whereas the other is stationary in such an inertial reference frame. As a consequence the mechanical state of the electrical machine is fully described by the single mechanical free coordinate and its first total time derivative.

In case the electrical machine is a rotating one, the moving part is constituted by the rotor. The free coordinate and its first total time derivative are the rotor angular position $\theta_m$ and angular speed $\omega_m$ respectively. When the electrical machine is a linear one, the free coordinate and its first total time derivative are the abscissa and linear speed respectively, both defined along the trajectory curve in the space. These assumptions describe the vast majority of the existing electrical machines and exclude the explicit dependence of the machine state-function model on the speed as explicit independent variable. Such a dependence should be considered if the machine parts were non-rigid bodies, a case demanding the introduction of at least one additional free coordinate.

The system of ordinary differential equations describing a generic electromagnetic system whose coenergy is known can be summarized by Eq. 2.1 below:

$$\begin{cases} \dfrac{d}{dt}\underbrace{\left(\dfrac{\partial Wco(\overline{i}(t), \theta_m(t))}{\partial i_j}\right)}_{\text{Flux } \lambda_j(\overline{i}(t),\theta_m(t))} = v_j(t) - r_j \cdot i_j(t) \\ \underbrace{\dfrac{\partial Wco(\overline{i}(t), \theta_m(t))}{\partial \theta_m}}_{\text{Torque Tem}(\overline{i}(t),\theta_m(t))} + T_l(t) = J \cdot \dfrac{d\omega_m(t)}{dt} \end{cases} \quad (2.1)$$

Simulation of the Coenergy Model and its Derivation from FEM Computations

The arguments of the total time derivative in the n electrical equations present in Eq. 2.1 are the total fluxes linked with each one of the n windings. In turn, such fluxes are clearly functions of the n currents and $\theta_m$ too. It descends that the n electrical equations can be expanded in the form reported in Eq. 2.2 where the first total derivative of all state variables can be easily rendered explicit, in all points where the Hessian of the coenergy is non singular.

$$\begin{cases} \sum_{k=1}^{n} \left\{ \left[ \frac{\partial^2 Wco(\bar{i}(t), \theta_m(t))}{\partial i_j \partial i_k} \right] \cdot \frac{di_k(t)}{dt} \right\} + \frac{\partial^2 Wco(\bar{i}(t), \theta_m(t))}{\partial i_j \partial \theta_m} \cdot \omega_m(t) = v_j(t) - r_j \cdot i_j(t) \\ J \cdot \frac{d\omega_m(t)}{dt} = \frac{\partial Wco(\bar{i}(t), \theta_m(t))}{\partial \theta_m} + T_l(t) \\ \frac{d\theta_m(t)}{dt} = \omega_m(t) \end{cases} \quad (2.2)$$

Derivation of the Coenergy Model from the Classical Ones and Vice Versa

The classical linear machine models in QD reference frame with one zero components in three-phase case, or more than one in the case of multiple phases, can be straightforwardly converted into the coergery model through the following steps:

Sensorless Operation and a Necessary Condition for it as Seen from the Coenergy-Based Model It is worthwhile to address the aspect of determining $\theta_m$, $\omega_m$ without mechanical and the $n_{NO}$ non observable currents (forced or willingly), once the coenergy and its aforementioned partial derivates are supposed to be known.

Such a system is non-linear in $i_{NO}$ and $\theta_m$ but algebraic, not differential, at each instant of time. It is assumed that the fluxes linked with the g windings are known at each time instant, either by integration, or by possible direct measurement using proposed sensors and arrangements.

$$\begin{cases} \frac{\partial Wco(\bar{i}(t), \theta_m(t))}{\partial i_{O1}} = \lambda_{O1}(\bar{i}_O(t), \bar{i}_{NO}(t), \theta_m(t)) \\ \qquad = \int_{t0^-}^{t} [v_{O1}(\tau) - r_{O1} \cdot i_{O1}(\tau)] d\tau + \lambda_{O1}(t0^-) \\ \frac{\partial Wco(\bar{i}(t), \theta_m(t))}{\partial i_{O2}} = \lambda_{O2}(\bar{i}_O(t), \bar{i}_{NO}(t), \theta_m(t)) \\ \qquad = \int_{t0^-}^{t} [v_{O2}(\tau) - r_{O2} \cdot i_{O2}(\tau)] d\tau + \lambda_{O2}(t0^-) \\ \vdots \\ \frac{\partial Wco(\bar{i}(t), \theta_m(t))}{\partial i_{Og}} = \lambda_{Og}(\bar{i}_O(t), \bar{i}_{NO}(t), \theta_m(t)) \\ \qquad = \int_{t0^-}^{t} [v_{Og}(\tau) - r_{Og} \cdot i_{Og}(\tau)] d\tau + \lambda_{Og}(t0^-) \end{cases} \quad (2.3)$$

Once the non-obervatable currents and the angle $\theta_m$ have been determined by solving Eq. 2.3, the torque is immediately obtained by entering them in the function. Equation 2.4 shows the result with the $w^{th}$ winding, chosen conveniently among the g ones whose resistances, currents and voltages are measurable. In the instants when such a partial derivative is nullified, by the currents and the $\theta_m$ assuming its root values, one can use the same Eq. 2.4, but for a different winding, still chose among the $n-n_{NO}$ observable ones.

$$\omega_m(t) = \frac{1}{\frac{\partial^2 Wco(\bar{i}(t), \theta(t))}{\partial i_w \partial \theta_m}} \cdot \left[ v_w(t) - r_w \cdot i_w(t) - \left( \frac{\partial^2 Wco(\bar{i}(t), \theta(t))}{\partial i_w \partial i_k} \right) \cdot \frac{di_k(t)}{dt} \right] \quad (2.4)$$

Assumptions of Symmetry May Impair the Sensorless Capabilities

It is worthwhile to recall here the sensorless limitations introduced by the common modes hypothesizing the zero sum of the voltages across z windings connected in star by one common node N. When the z free terminals of such windings are, in turn, connected to z voltage sources having a common terminal in a different node O, the whole electrical network is bimodal and the voltage across the two nodes affects the voltage equations of all branches as shown in Eq. 2.5.

$$\frac{d}{dt}\left[\frac{\partial Wco(\bar{i}(t), \theta_m(t))}{\partial i_1}\right] + r_1 \cdot i_1(t) = v_1(t) = e_1 - v_{NO} \quad (2.5)$$

$$\frac{d}{dt}\left[\frac{\partial Wco(\bar{i}(t), \theta_m(t))}{\partial i_2}\right] + r_2 \cdot i_2(t) = v_2(t) = e_2 - v_{NO}$$

$$\vdots$$

$$\frac{d}{dt}\left[\frac{\partial Wco(\bar{i}(t), \theta_m(t))}{\partial i_z}\right] + r_z \cdot i_z(t) = v_z(t) = e_z - v_{NO}$$

The sum of all equations at both members leads eventually to Eq. 2.6 for voltage across the two nodes. Such as voltage is equal to the "common mode" voltage of the z voltage sources, if an only if all resistances $r_p$ are equal AND, mainly, if and only if the sum of the fluxes of all z windings—which constitutes the argument of the total time derivative—is identically zero.

$$v_{NO} = \frac{1}{z}\sum_{p=1}^{z} e_p - \frac{1}{z}\frac{d}{dt}\sum_{y=1}^{z}\left[\frac{\partial Wco(\bar{i}(t), \theta_m(t))}{\partial i_y}\right] - \frac{r_q \cdot i_q(t)}{z} \quad (2.6)$$

The Torque Kernel

It is always important to know the set of winding currents and angles capable of maintaining the torque constant at a desired value $Tem^d$. The values of the currents are obviously dependent on the specific angle value $\theta_m^d$ and can be obtained through the algebraic non-linear equation 2.7:

$$\left.\frac{\partial Wco(\bar{i}, \theta_m)}{\partial \theta_m}\right|_{\theta_m=\theta_m^d} = Tem^d \quad (2.7)$$

Model Identification when all Windings are Accessible

The identification of the coenergy via measurements at the machine electrical terminals is an already employed technique for switched, and some synchronous, reluctance machines. By recalling the fundamental relationship 3.1 involving the energy and coenergy of an electromechanical system with n windings, the experimental method can be genreized to all electrical machines whose entirety of windings is accessible.

$$We(\bar{\lambda}_p(t), \theta_m(t)) + Wco(\bar{i}(t), \theta_m(t)) = \lambda_p(\bar{i}(t), \theta_m(t)) \cdot i_p(t) \quad (3.1)$$

Identification, and its Limits, Through Measurements at the Electrical Ports Only The coenergy, like the energy, is a state function of the electromechanical system, therefore its value depends only on the point defined by the ordered set of values of its arguments, and not on the trajectory followed to reach that point. One can exploit this property to improve the accuracy in determining the coenergy though Eq. 3.2:

$$\begin{cases} \partial Wco(\vec{i}^*(t), \theta_m^*) = \begin{vmatrix} \underbrace{\int_{0^-}^{t} [v_p(\vec{F}(\xi), \vartheta) - r_p \cdot i_p^*(\xi)] d\xi \cdot i_p^*(t)}_{\text{term A Scalar product between the variation of fluxes and current}} \bigg|_{\vartheta=\theta_m^*, \frac{d\vartheta}{dt}=0} + - \\ \underbrace{\int_{0^-}^{t} \{[v_\chi(\vec{F}(\varepsilon), \vartheta) - r_\chi \cdot i_\chi^*(\varepsilon)] \cdot i_\chi^*(\varepsilon)\} d\varepsilon}_{\text{term B Variation of Energy stored in the electromagnetic field}} \bigg|_{\vartheta=\theta_m^*, \frac{d\vartheta}{dt}=0} ++ \\ \underbrace{\lambda_p(\overline{0_n}, \theta_m^*) \cdot i_p^*(t)}_{p^{th} \text{ Constant initial flux}} + \underbrace{Wco(\overline{0_n}, \theta_m^*)}_{\text{Constant initial coenergy equal to } -We(\overline{0_n}, \theta_m^*)} \end{vmatrix} \\ i_1^*(t) \\ i_2^*(t) \\ \vdots \\ i_n^*(t) \end{cases} \Rightarrow Wco\ i^*(\theta_m^*) \quad (3.2)$$

The proposed methodology, to be applied for each desired $\theta_m$ is illustrated by the following sequence. It is assumed that final values of the n currents for which the coenergy must be computed constitute the vector $i_g$. After the current-controlled settling transients have elapsed, such values are imposed through DC currents injected into the windings and created either by switching or linear converters, capable of maintaining a low current ripple, or even by batteries and rheostats for maximum measurement accuracy against the influence of the fast current variations and against the error introduced by the influence of the iron losses in the identification phase.

1. Vary the current value of the $r^{th}$ winding from 0 to $i_{gr}$ while keeping the currents in all other n−1 windings unaltered at their present DC value, which is possibly zero. Record the current and voltage transients occurring in all n windings with the proper sampling time. Although the evolution of the current in the $r^{th}$ winding from 0 to $i_{gr}$ is in principal irrelevant, good measurement practice strongly suggest to follow a linear ramp which also allows additional identifications as described subsequently.
2. At the end of the transients each winding voltage is created by the resistive term only, without any contribution caused by the inductive coupling with the other windings. Consequently it is possible to determine an updated value of the n winding resistances with high accuracy by performing, for each winding, the ration between the voltage and the injected DC current.
3. With the values of the resistances eliminated in the previous step, one can compute the integrals in Eq. 3.2 by using the waveforms recorded in the transient just elapsed. The computation of the integrals delivers also the variations of the fluxes linked with the n windings.
4. The steps 1 to 3 are repeated for the currents of the remaining windings until the point $i_B$ is reached and variation of the coenergy associated with it—represented by the difference of the integrals in Eq. 3.2 is computed.

Machines with Non Zero Flux and Coenergy at Zero Currents. The Necessity of Mechanical Measurements By allowing even a slow, almost static, rotation of the rotor and the measurement of the torque at standstill one can identify a real constant for all independent variables, therefore not capable of introducing any ambiguity in the model.

$$Wco(\overline{0_n}, \theta_m^*) = \int_{\theta_0}^{\theta_m^*} Tem(\overline{0_n}, \varepsilon) d\varepsilon + Wco(\overline{0_n}, \theta_0) \quad (3.3)$$

Equation 3.4 expresses the principle, where lambda p is again a real constant for all independent variables, therefore, it does not introduce ambiguities in the model even if it remains unknown.

$$\lambda_p(\overline{0_n}, \theta_m^*) = \frac{1}{\omega_m^*} \int_{\theta_0}^{\theta_m^*} v_p\left(\frac{\kappa}{\omega_m^*}\right) d\kappa + \lambda_p(\overline{0_n}, \theta_0) \quad (3.4)$$

The conclusion is that the complete identification of machines with significant presence of magnetic field also when all winding currents are zero (e.g. in case of permanent magnets requires:

1. An almost static rotation of the rotor, where the static torque is measured without the need of expensive torsiometers.
2. A rotation of the rotor at constant speed but without the need of measuring the torque, just the voltages at the winding terminals, are kept open.

Partial Derivatives of the Coenergy Through Parametric Interpolation and Possible Indirect Measurement The n voltage equations from the system can be reduced to the n equation shown in Eq. 3.5 since the derivatives of all currents are zero with the exception of the one in the $r^{th}$ winding.

$$\frac{\partial^2 Wco(\vec{i}_A, \theta_m^*)}{\partial i_j \partial i_r} = \frac{v_j(t) - r_j \cdot i_j(t)}{\frac{di_r(t)}{dt}} \quad (3.5)$$

By producing linear current variations for each $r^{th}$ winding, the derivative at the denominator of Eq. 3.5 is rendered constant, therefore more precisely measureable.

The advantages of this idenfication method are:
- If the machines has zero initial fluxes AND zero coenergy by zero winding currents, only the measurements at the electrical terminals of the machine are needed, no torque measurement is necessary.
- The accuracy is improved by frequent accurate measurement of the winding resistances in the time intervals when the constant winding currents eliminate any voltage contribution by electromagnetic induction among the windings.
- By varying linearly one winding current at the time, the variations of the fluxes and of the coenergy are more accurately measured.
- The use of constant currents in steady state permits very accurate current and resistance measurement, additionally it can potentially eliminate the iron losses (via proper voltage sources) together with the related measurement errors they otherwise introduce in the identified winding resistances.
- Since the angle $\theta_m$ can be imposed with greater accuracy, the numerical partial derivates with respect to it are less prone to numerical errors related to the angle.

Improved Accuracy Via Measurements at Both Electrical and Mechanical Ports

By zero speed, and by neglecting the iron losses in the rotor, the coenergy can be obtained by:

$$Wco(\vec{i}^*, \theta_m^*) = \int_{\theta_0}^{\theta_m^*} Tem(\vec{i}^*, \varepsilon) \, d\varepsilon + Wco(\vec{i}^*, \theta_0) \quad (3.6)$$

What is claimed is:

1. A control device for controlling and/or identifying in real-time an electric machine with ks windings on a stator and kr windings on a rotor, wherein ks+kr=n and wherein either one of ks and kr may be zero, the control device comprising:
   - at least one input via which control commands are capable of being received and at least one output via which control commands to a driver of the electric machine are capable of being output;
   - machine modeling means provided for modeling in real-time the behavior of the electric machine; and
   - decision means operatively connected to the input, the output, and the machine modeling means and provided for determining in real-time the control commands to be output to the driver of the electric machine based on input control commands and results from the real-time modeling of the behavior of the electric machine, and outputting in real-time the determined control commands at the output, wherein
   - the machine modeling means is provided for modeling the behavior of the electrical machine through at least one functional mapping suited for correlating sets of values of electrical and mechanical quantities and/or sets of values of their total or partial derivatives, and/or integral functions with one another, and
   - said electrical and mechanical quantities are selected from the group consisting of winding currents, winding voltages, magnetic fluxes, mechanical displacements, electromagnetic torques and forces, characterized in that
   - said functional mapping comprises at least one algorithm or mathematical equation based on at least one state function associated with the electromagnetic field inside the electrical machine or based on at least one partial derivative of said state function, and
   - the state function is a model based on the coenergy or energy associated with the electromagnetic field inside the electric machine.

2. The control device of claim 1 wherein the machine modeling means is capable of modeling in real-time the behavior of the electric machine without requiring any mathematical transformation on physical quantities defining the domain of the state function.

3. The control device of claim 1 wherein the model is based on the following equation system, or a discretized form thereof:

$$\begin{cases} \underbrace{\dfrac{d}{dt}\left(\dfrac{\partial Wco(\vec{i}(t), \theta_m(t))}{\partial i_j}\right)}_{\text{Flux } \lambda_j(\vec{i}(t),\theta_m(t))} = v_j(t) - r_j \cdot i_j(t) \\ \underbrace{\dfrac{\partial Wco(\vec{i}(t), \theta_m(t))}{\partial \theta_m}}_{\text{Torque } Tem(\vec{i}(t),\theta_m(t))} + T_l(t) = J \cdot \dfrac{d\omega_m(t)}{dt} \end{cases}$$

wherein the first equation of the system is provided in a plurality, expressed by the lowercase natural index j, corresponding to the number n of windings and the symbols of the equations are identified as follows:
$\theta_m$ Scalar value of the angular position of the rotor
$\omega_m$ Scalar value of the rotational speed of the rotor around its axis assumed stationary in an inertial reference frame
$\vec{i}$ Vector of the n winding currents
$v_j, i_j$ Voltage and current of the $j^{th}$ winding (a two-terminal network) $j \in \{1 \ldots n\}$; they are referred to the users' convention with the current reference direction entering the winding terminal
J Equivalent total moment of inertia of the rotating masses; it is referred to the rotor axis of rotation
$r_j$ Resistance of the $j^{th}$ winding $j \in \{1 \ldots n\}$
$Wco(\vec{i},\theta_m)$ Coenergy of the electromagnetic field in the overall machine space, expressed as state function of the winding currents and angular position of the rotor
$T_l$ Scalar value of the torque exerted by the mechanical system coupled to the electrical machine; it is referred to the rotor axis of rotation.

4. The control device of claim 1 wherein the model is based on the following equation system, or a discretized form thereof:

$$\begin{cases} \sum_{k=1}^{n}\left\{\left[\dfrac{\partial^2 Wco(\vec{i}(t), \theta_m(t))}{\partial i_j \partial i_k}\right] \cdot \dfrac{di_k(t)}{dt}\right\} + \dfrac{\partial^2 Wco(\vec{i}(t), \theta_m(t))}{\partial i_j \partial \theta_m} \cdot \\ \omega_m(t) = v_j(t) - r_j \cdot i_j(t) \\ J \cdot \dfrac{d\omega_m(t)}{dt} = \dfrac{\partial Wco(\vec{i}(t), \theta_m(t))}{\partial \theta_m} + T_l(t) \\ \dfrac{d\theta_m(t)}{dt} = \omega_m(t) \end{cases}$$

wherein the first equation is provided in a plurality corresponding to the number n of windings and the symbols of the equations are identified as follows:
$\theta_m$ Scalar value of the angular position of the rotor
$\omega_m$ Scalar value of the rotational speed of the rotor around its axis assumed stationary in an inertial reference frame ī Vector of the n winding currents $v_j$, $i_j$ Voltage and current of the $j^{th}$ winding (a two-terminal network) $j \in \{1 \ldots n\}$; they are referred to the users' convention with the current reference direction entering the winding terminal J Equivalent total moment of inertia of the rotating masses; it is referred to the rotor axis of rotation $r_j$ Resistance of the $j^{th}$ winding $j \in \{1 \ldots n\}$ $Wco(\bar{i}, \theta_m)$ Coenergy of the electromagnetic field in the overall machine space, expressed as state function of the winding currents and angular position of the rotor $T_l$ Scalar value of the torque exerted by the mechanical system coupled to the electrical machine; it is referred to the rotor axis of rotation.

5. The control device of claim 1 wherein the machine modeling means is provided with the coenergy or energy associated with the electromagnetic field inside the electric machine either numerically in a table or as an analytical function or artificial intelligence descriptor, or discretized form thereof, wherein the artificial intelligence descriptor preferably is a set of artificial neural networks and/or fuzzy inferences.

6. The control device of claim 1 wherein the control device comprises at least one input via which measured or estimated quantities of the electric machine are capable of being received and wherein the machine modeling means is provided to identify the coenergy or energy associated with the electromagnetic field inside the electric machine based on the measured or estimated electrical and/or mechanical quantities of the electric machine.

7. The control device of claim 6 wherein the measured or estimated quantities of the electric machine comprise at least one current in at least one of the n windings and at least one voltage across at least one of the n windings as measured or estimated while the rotor of the electric machine is stationary in at least one selected angular position.

8. The control device of claim 6 wherein the measured or estimated quantities of the electric machine comprise at least one winding resistance of at least one of the n windings when the rotor of the electric machine is stationary in the at least one selected angular position.

9. The control device of claim 6 wherein the measured or estimated quantities of the electric machine comprise the mechanical torque at the shaft of the electric machine.

10. A driver for an electric machine comprising the control device of claim 1.

11. An electric machine provided with a driver comprising the control device of claim 1.

12. The electric machine of claim 11 wherein the driver is integrated with the electric machine to form a single body.

13. A control method for controlling an electric machine with ks windings on a stator and kr windings on a rotor, wherein ks+kr=n and wherein either one of ks and kr may be zero, comprising the steps of:

receiving in real-time input control commands;

modeling in real-time the behavior of the electric machine;

determining in real-time control commands to be output to a driver of the electric machine based on the input control commands and results from the modeling of the behavior of the electric machine; and outputting in real-time the determined control commands to the driver of the electric machine, wherein the modeling of the behavior of the electrical machine is made through at least one functional mapping suited for correlating sets of values of electrical and mechanical quantities and/or sets of values of their total or partial derivatives and/or integral functions with one another, and said electrical and mechanical quantities are selected from the group of winding currents, winding voltages, magnetic fluxes, mechanical displacements, electromagnetic torques, and forces, characterized in that said functional mapping comprises at least one algorithm or mathematical equation based on at least one state function associated with the electromagnetic field inside the electrical machine and/or based on at least one partial derivative of said state function; and the modeling is based on the coenergy or energy associated with the electromagnetic field inside the electric machine.

14. The method of claim 13 wherein the coenergy or energy associated with the electromagnetic field inside the electric machine is provided either numerically from simulations or as an analytical function, or discretized form thereof.

15. The method of claim 14 wherein electrical and/or mechanical quantities of the electric machine are measured or estimated in real-time; and the coenergy or energy associated with the electromagnetic field inside the electric machine is identified based on the measured or estimated quantities.

16. The method of claim 15 wherein the measured quantities of the electric machine comprise at least on current in at least one of the n windings and at least one voltage across at least one of the n windings, wherein the current and voltage are measured or estimated while the rotor of the electric machine is stationary in at least one selected angular position.

17. The method of claim 15 wherein the electric machine is provided with at least one separate sensing winding representative of one among the n the windings of the electric machine with respect to the voltage thereof; and the voltage across said one winding is measured as proportional to the voltage across the separate sensing winding.

18. The method of claim 15 wherein the measured or estimated quantities of the electric machine comprise the mechanical torque at the shaft of the electric machine and wherein the mechanical torque is measured or estimated by mechanical arrangements based on at least one load cell.

19. The method of claim 15 wherein the measured or estimated quantities of the electric machine comprise the total time derivative of at least one current in at least one of the n windings of the electric machine and wherein said total time derivative of the least one current is measured directly by a sensor sensible to its value, and wherein preferably said sensor is a sensing coil arranged around a conductor conducting said at least one current among the currents, and a voltage across said sensing coil is proportional to said total time derivative of said least one current among the currents; or said sensor is a calibrated inductor connected in series with a conductor conducting said at least one current among the currents, and a voltage across said calibrated inductor is proportional to said total time derivative of said least one current among the currents.

20. The method of claim 19 wherein the sensing coil is a Rogowski coil.

* * * * *